United States Patent
Hayami et al.

(10) Patent No.: US 7,751,214 B2
(45) Date of Patent: Jul. 6, 2010

(54) POWER CONTROL APPARATUS AND METHOD

(75) Inventors: Yasuaki Hayami, Yokosuka (JP); Kentarou Shin, Yokohama (JP); Kraisorn Throngnumchai, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 490 days.

(21) Appl. No.: 11/789,050

(22) Filed: Apr. 23, 2007

(65) Prior Publication Data

US 2007/0247881 A1    Oct. 25, 2007

(30) Foreign Application Priority Data

Apr. 24, 2006    (JP) .............................. 2006-119217

(51) Int. Cl.
    H02M 7/537    (2006.01)
(52) U.S. Cl. ...................................... 363/131
(58) Field of Classification Search ................... 363/17, 363/41, 98, 131; 318/807
    See application file for complete search history.

(56) References Cited

U.S. PATENT DOCUMENTS

| 4,587,605 | A | 5/1986 | Kouyama et al. |
|---|---|---|---|
| 4,691,269 | A | 9/1987 | Yamane et al. |
| 4,851,982 | A | 7/1989 | Tanahashi |
| 4,905,135 | A | 2/1990 | Unehara et al. |
| 5,068,777 | A | 11/1991 | Ito |
| 5,155,675 | A | 10/1992 | Maruyama et al. |
| 5,422,557 | A | 6/1995 | Lee et al. |
| 5,467,262 | A | 11/1995 | Nakata et al. |
| 5,627,742 | A | 5/1997 | Nakata et al. |
| 6,969,968 | B2 * | 11/2005 | Throngnumchai .......... 318/807 |
| 7,042,741 | B2 | 5/2006 | Tanaka et al. |
| 7,102,903 | B2 | 9/2006 | Nakamura et al. |
| 7,282,682 | B2 | 10/2007 | Suenaga et al. |
| 7,542,312 | B2 * | 6/2009 | Meguro et al. ............... 363/41 |
| 2006/0192520 | A1 * | 8/2006 | Yin et al. ..................... 318/802 |
| 2006/0221656 | A1 * | 10/2006 | Meguro et al. ............... 363/95 |
| 2007/0252625 | A1 | 11/2007 | Shin et al. |
| 2008/0089102 | A1 | 4/2008 | Hayami et al. |
| 2008/0106919 | A1 | 5/2008 | Shin et al. |

FOREIGN PATENT DOCUMENTS

| JP | 03218270 A | * | 9/1991 |
|---|---|---|---|
| JP | 07-099795 | | 4/1995 |
| JP | 2002-095262 A | | 3/2002 |
| JP | 2006-136138 A2 | | 5/2006 |

* cited by examiner

*Primary Examiner*—Adolf Berhane
(74) *Attorney, Agent, or Firm*—Young Basile (57) ABSTRACT

A power control apparatus and power control method that reduce harmonic noise produced when modulating a carrier wave frequency over predetermined cycles. A command value signal is generated for obtaining a desired output voltage, and a carrier wave is output. The frequency of the carrier wave is modulated by a desired frequency over predetermined cycles, and the desired frequency also modulates. The carrier wave is compared to a command value signal and a resulting control signal is provided to a switching unit. Harmonic noise caused by the modulation frequency can be spread, and the peak of the harmonic noise caused by the first modulation frequency can be reduced. Therefore, noise caused by a modulation frequency can be reduced.

20 Claims, 6 Drawing Sheets

POWER CONTROL APPARATUS AND METHOD

CROSS-REFERENCE TO RELATED APPLICATIONS

This application claims priority from Japanese Patent Application Serial No. 2006-119217, filed on Apr. 24, 2006, which is incorporated herein in its entirety by reference.

TECHNICAL FIELD

The invention relates to a power control apparatus and method capable of obtaining a desired output voltage waveform by modulating an output from a power supply.

BACKGROUND

There are known power conversion apparatuses designed to obtain an output voltage of a desired form from an input voltage. Such power conversion apparatuses compare a voltage (hereinafter referred to as a "command voltage") proportional in magnitude to an output voltage of a desired form with a voltage (hereinafter referred to as a "carrier wave") having a certain output waveform, and output to a switching element, such as a transistor, a control signal for controlling the on or off operation of the switching element according to the comparison result.

The on or off operation of the switching element is performed based on the control signal to obtain the output voltage of the desired form.

However, when the waveform of the carrier wave is constant over time, that is, when the carrier wave frequency is constant, harmonic noise corresponding to the carrier wave frequency occurs and has an adverse effect on apparatuses having the power conversion apparatuses or peripheral electronic apparatuses.

One known apparatus in which harmonic noise is reduced is a stepping motor control apparatus taught in Japanese Unexamined Patent Application Publication No. 7-99795. Therein, the stepping motor control apparatus controls the opening and closing of a switching element based on a result of comparing in magnitude between a command voltage and a carrier wave whose carrier wave frequency is modulated into a sinusoidal-wave shape. That is, the carrier wave frequency is changed to generate a sinusoidal wave. The frequency by which the carrier wave frequency is changed serves as a modulation frequency. The stepping motor control apparatus further controls the magnitude and direction of a current to be applied from a power supply to a motor to realize a desired rotational force of the motor.

BRIEF SUMMARY

In one power control apparatus for controlling a power conversion device taught herein comprises a carrier-wave frequency changing unit operable to modulate a frequency of a carrier wave with a desired frequency over predetermined cycles and further operable to modulate the desired frequency and a comparator configured to compare the carrier wave to a command value signal for obtaining a desired output voltage and to generate a control signal based on the comparison. A switching unit of the power conversion device is configured to perform switching based on the control signal.

Another example of a power control apparatus comprises means for outputting a command value signal for obtaining a desired output voltage, means for outputting a carrier wave, means for modulating a frequency of the carrier wave with a desired frequency over predetermined cycles, means for modulating the desired frequency, means for comparing the carrier wave with the command value signal and for generating a control signal based on a result of the comparing and means for performing switching based on the control signal.

Methods for controlling a power conversion device including a switching unit are also taught herein. One such power control method comprises generating a command value signal for obtaining a desired output voltage, generating a carrier wave, modulating a frequency of the carrier wave with a desired frequency over predetermined cycles, modulating the desired frequency, comparing the carrier wave to the command value signal, generating a control signal based on a result of the comparing and performing switching based on the control signal.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the above-described stepping motor control apparatus, the bandwidth of harmonic noise generated when the carrier wave signal has a constant waveform can be increased (that is, the peak value of the noise can be reduced) since the carrier wave frequency is modulated into a sinusoidal-wave shape. The effect of the harmonic noise on an electronic apparatus can be reduced. Accordingly, the peak value of the harmonic noise generated can be reduced when the carrier wave frequency is constant. However, since the carrier wave frequency is modulated with constant cycles, or in other words, a modulation frequency having the constant cycles appears, noise caused by the modulation frequency newly occurs.

In contrast, embodiments of the invention taught herein are designed to reduce noise caused by a modulation frequency. For example, in a power control apparatus and a power control method taught herein, a carrier wave is generated by further modulating a modulation frequency with which the carrier wave frequency is modulated. Therefore, the bandwidth of harmonic noise caused by the modulation frequency can be increased, and the harmonic noise caused by the modulation frequency can be reduced.

Embodiments of the invention are discussed in more detail with reference to the drawings.

Figure 1:
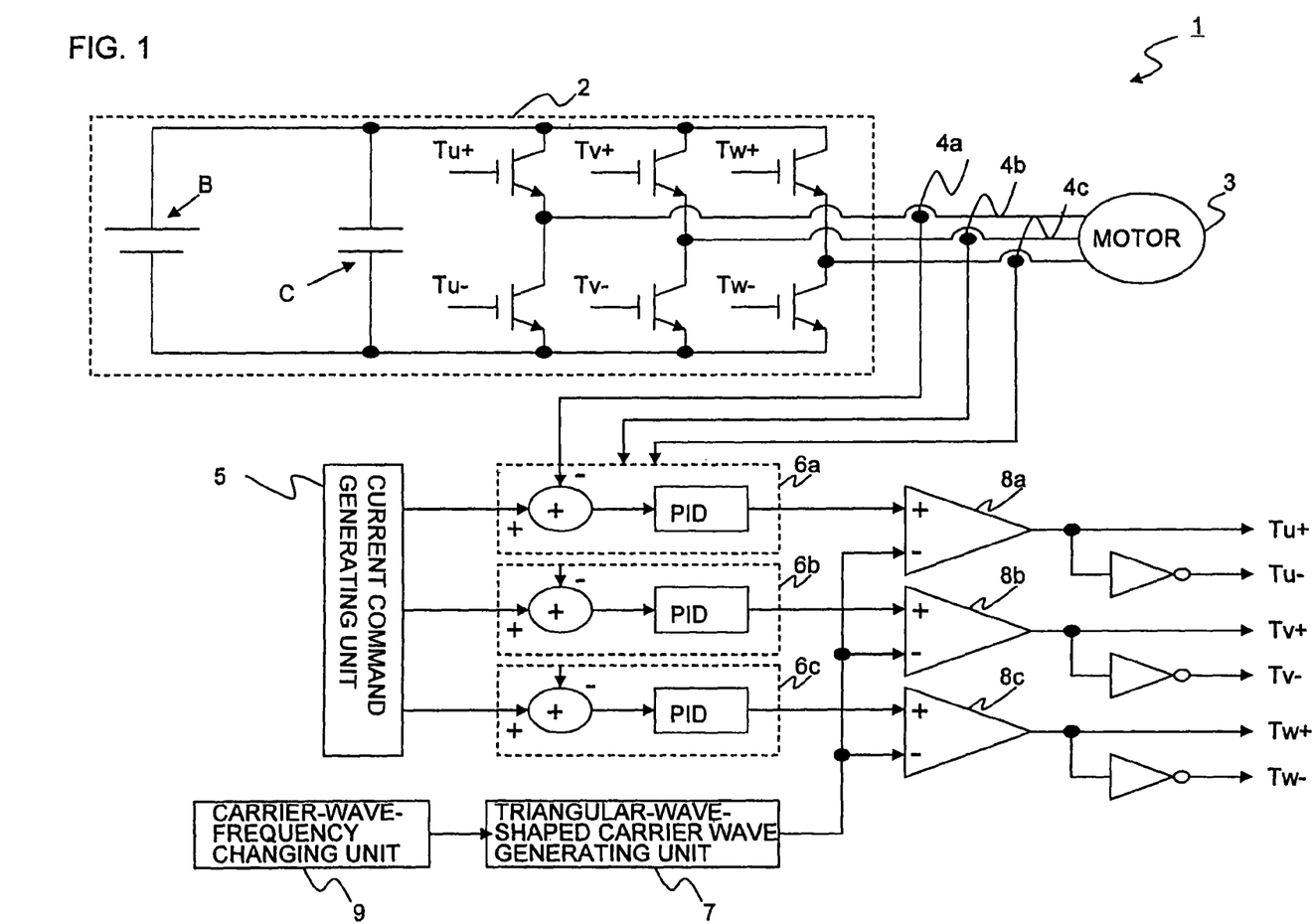
FIG. 1 is a block diagram of a power conversion apparatus according to one embodiment of the invention.

As shown in FIG. 1, a power control apparatus 1 according to a first embodiment of the invention includes, as main components, a power converter switching unit such as a pulse width modulation (PWM) inverter 2, a three-phase brushless motor (hereinafter referred to as a "motor") 3, current sensors 4a to 4c, a current command generating unit 5, proportion integral derivation (PID) control units 6a to 6c, a triangular-wave-shaped carrier wave generating unit 7, comparators 8a to 8c, a carrier-wave-frequency changing unit 9 and a control unit (not shown) that controls the overall operation of the power control apparatus 1 including the above-described components. Alternatively, instead of a separate control unit, the current command generating unit 5, proportion integral derivation (PID) control units 6a to 6c, triangular-wave-shaped carrier wave generating unit 7, comparators 8a to 8c and carrier-wave-frequency changing unit 9 could be incorporated in whole or in part in a microcomputer including a central processing unit (CPU), input and output ports (I/O), random access memory (RAM), keep alive memory (KAM), a common data bus and read only memory (ROM) as an electronic storage medium for executable programs and certain stored values as discussed hereinafter. That is, the functions performed by these elements described herein could be, for example, implemented in software as executable programs, or could be implemented in whole or in part by separate hardware in the form of one or more integrated circuits (IC).

The PWM inverter 2 includes six switching elements Tu+, Tu−, Tv+, Tv−, Tw+ and Tw− connected to U-phase, V-phase and W-phase electrodes of the motor 3. The PWM inverter 2 selects the positive or negative terminal of a direct-current (DC) power source formed of a battery B and a capacitor C on the basis of control signals output from the comparators 8a to 8c. Each of the switching elements Tu+, Tu−, Tv+, Tv−, Tw+ and Tw− is composed of a switching element such as an insulated gate bipolar transistor (IGBT).

The current sensors 4a to 4c detect respective U-phase, V-phase and W-phase current values supplied from the PWM inverter 2 to the motor 3 and input the current values to the PID control units 6a to 6c.

In response to feedback of the detection values detected by the current sensors 4a to 4c, the current command generating unit 5 performs control so that current command values are converted into a sinusoidal-wave shape and inputs the sinusoidal-wave-shaped current command values to the PID control units 6a to 6c.

The PID control units 6a to 6c perform PID control to generate voltage command values so that the detection values detected by the current sensors 4a to 4c accord with the current command values generated by the current command generating unit 5.

The triangular-wave-shaped carrier wave generating unit 7 generates a triangular-wave-shaped carrier wave and inputs the triangular-wave-shaped carrier wave to the comparators 8a to 8c.

The comparators 8a to 8c compare the triangular-wave-shaped carrier wave output from the triangular-wave-shaped carrier wave generating unit 7 with the output voltages output from the PID control units 6a to 6c in terms of magnitude. On the basis of the comparison results, the comparators 8a to 8c input to the PWM inverter 2 control signals for controlling the on or off operation of the switching elements Tu+, Tu−, Tv+, Tv−, Tw+ and Tw− of the PWM inverter 2. The operation of the comparator 8a will be specifically described, by way of example, in the context of the control of the U-phase switching elements Tu+ and Tu−. If the output voltage from the PID control unit 6a is greater than the triangular-wave-shaped carrier wave, the comparator 8a controls the switching elements Tu+ and Tu− to be turned on and off, respectively, to apply a positive voltage to the U phase of the motor 3. Conversely, if the output voltage from the PID control unit 6a is smaller than the triangular-wave-shaped carrier wave, the comparator 8a controls the switching elements Tu+ and Tu− to be turned off and on, respectively, to apply a negative voltage to the U phase of the motor 3.

The carrier-wave-frequency changing unit 9 inputs to the triangular-wave-shaped carrier wave generating unit 7 a modulation signal for changing the triangular-wave-shaped carrier wave frequency input from the triangular-wave-shaped carrier wave generating unit 7 with constant cycles.

Operation of the power control apparatus 1 according to embodiments of the invention is next described in detail but is best understood after first considering the impact of the carrier wave frequency on harmonic noise generation. Referring to FIGS. 2A to 4B, harmonic noise generation is described herein with respect to a constant carrier wave frequency, a carrier wave generated by changing the carrier wave frequency with constant cycles (here, into a triangular-wave shape) and a carrier wave generated by arbitrarily modulating the frequency by which the carrier wave frequency is changed. The effect of a temporal change in the carrier wave frequency in the power control apparatus 1 in the respective harmonic noise cases on another apparatus will further be described.

Figure 2A:
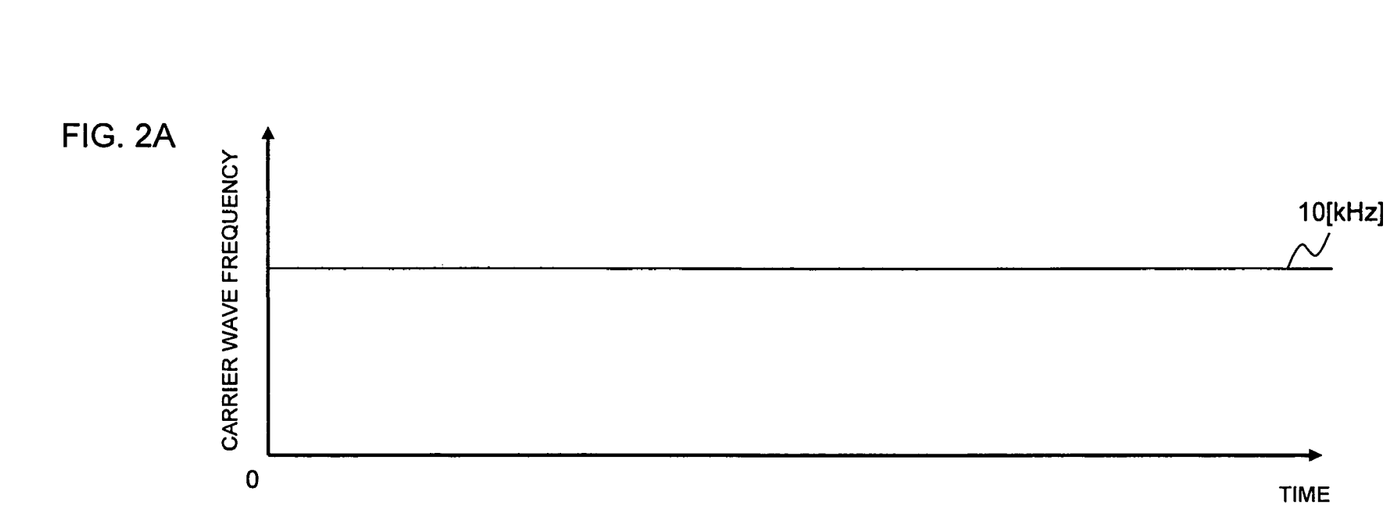
FIGS. 2A and 2B are diagrams showing harmonic noise generated when a carrier wave frequency is constant.

FIG. 2A shows an output waveform generated when the carrier wave frequency is constant. As shown in FIG. 2A, in a typical power control apparatus the carrier wave frequency has a constant value over time. For example, the carrier wave frequency has a value of 10 kHz.

Figure 2B:
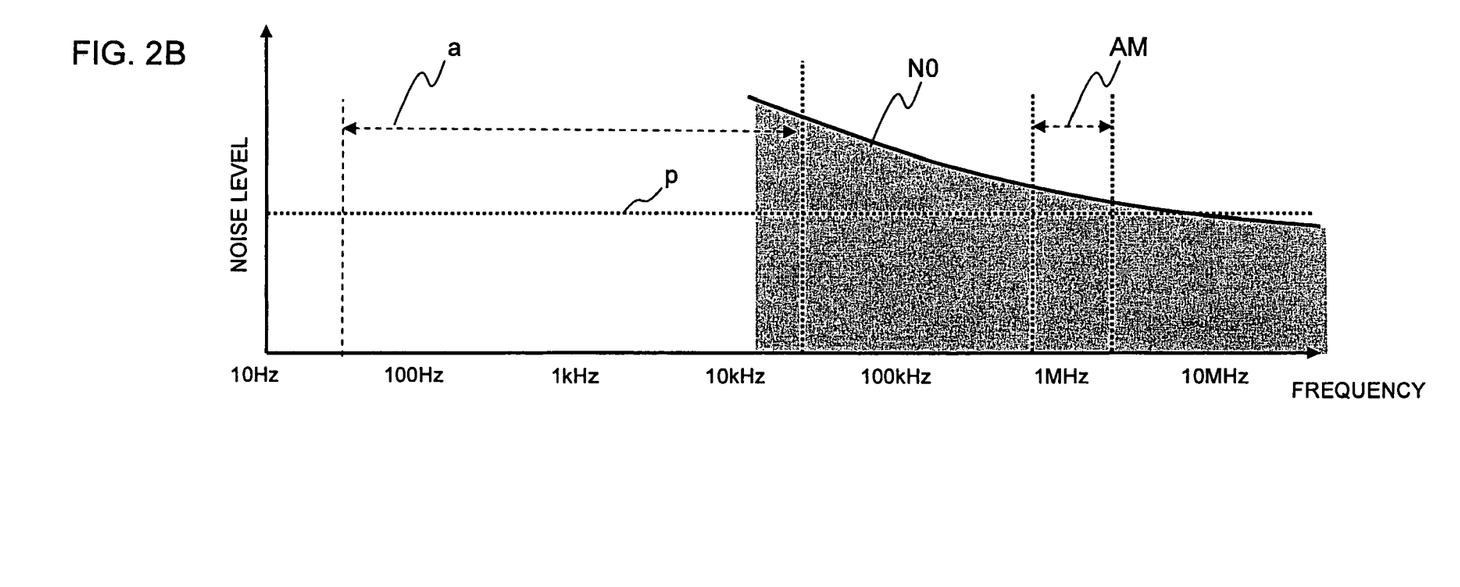

FIG. 2B shows harmonic noise generated when a carrier wave whose carrier wave frequency is constant is generated. In FIG. 2B reference symbol "N0" denotes harmonic noise caused by a harmonic frequency of the carrier wave frequency, reference symbol "a" denotes the audio frequency range audible to the human ear, and reference symbol "AM" denotes the amplitude modulation (AM) radio frequency band. When the carrier wave frequency is constant, the level of the harmonic noise N0 is high, and problems such as occurrence of radio noise can occur.

Figure 3A:
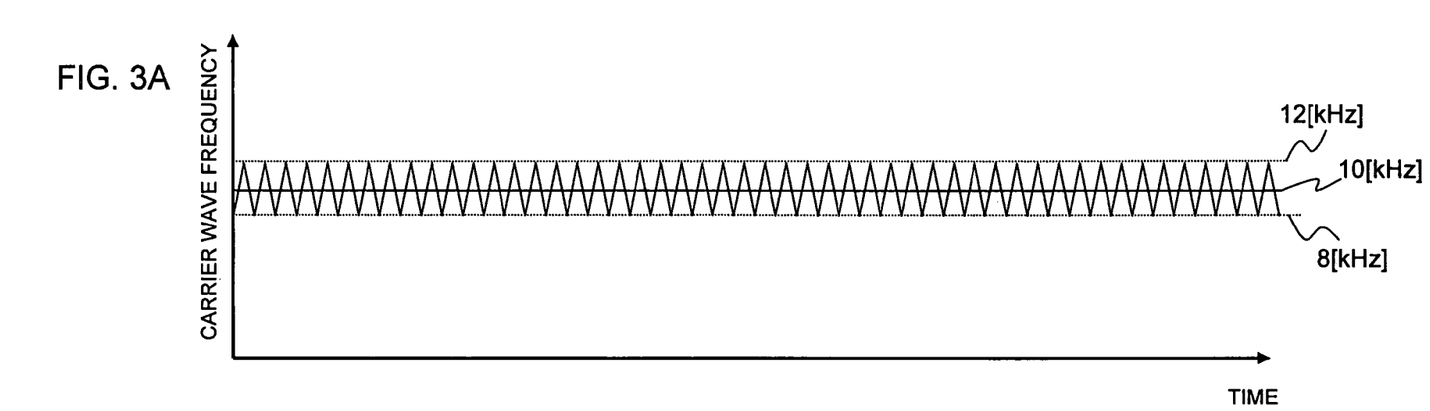
FIGS. 3A and 3B are diagrams showing harmonic noise generated when the carrier wave frequency is changed into a triangular-wave shape by a constant modulation frequency.
Figure 3B:
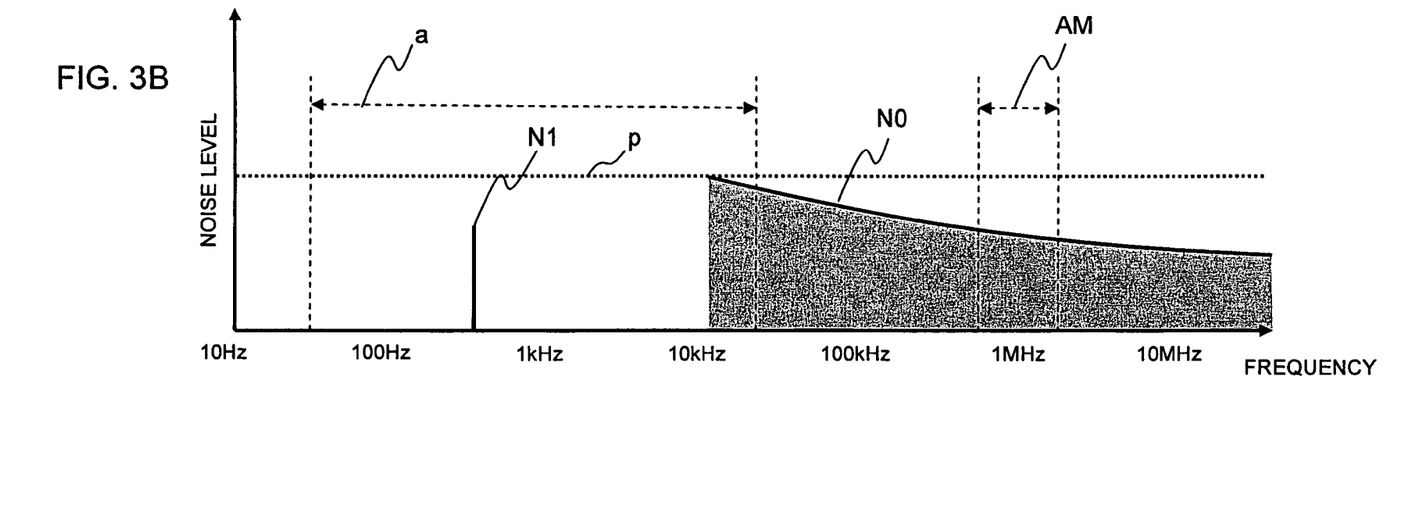

FIG. 3B shows harmonic noise generated when a carrier wave is generated by modulating the carrier wave frequency with constant cycles (into a triangular-wave shape).

As shown in FIG. 3A, the carrier wave frequency is modulated in a range between two frequencies 2 kHz higher and lower than a fundamental frequency of 10 kHz by a step value of 500 Hz (the step value is used as a first modulation frequency with respect to the fundamental frequency). A period during which the carrier wave frequency is increased from 8 kHz to 12 kHz by a step value of 500 Hz and is decreased from 12 kHz to 8 kHz by a step value of 500 Hz is equal to one cycle. The carrier wave frequency changes at constant intervals of this period.

As shown in FIG. 3B, the peak level of the harmonic noise N0 is reduced at the fundamental frequency, i.e., 10 kHz, from that shown in FIG. 2B because the peak bandwidth is spread by modulating the carrier wave frequency. Although the peak level p of the harmonic noise N0 is reduced, the carrier wave frequency is transformed into a triangular-wave shape by a constant step value of the first modulation frequency, and there arises a new problem. That is, for example, if harmonic noise N1 of the first modulation frequency newly occurs in the audio frequency range "a", a user listening to the radio can perceive, as a noise sound, acoustic noise caused by the first modulation frequency.

Figure 4A:
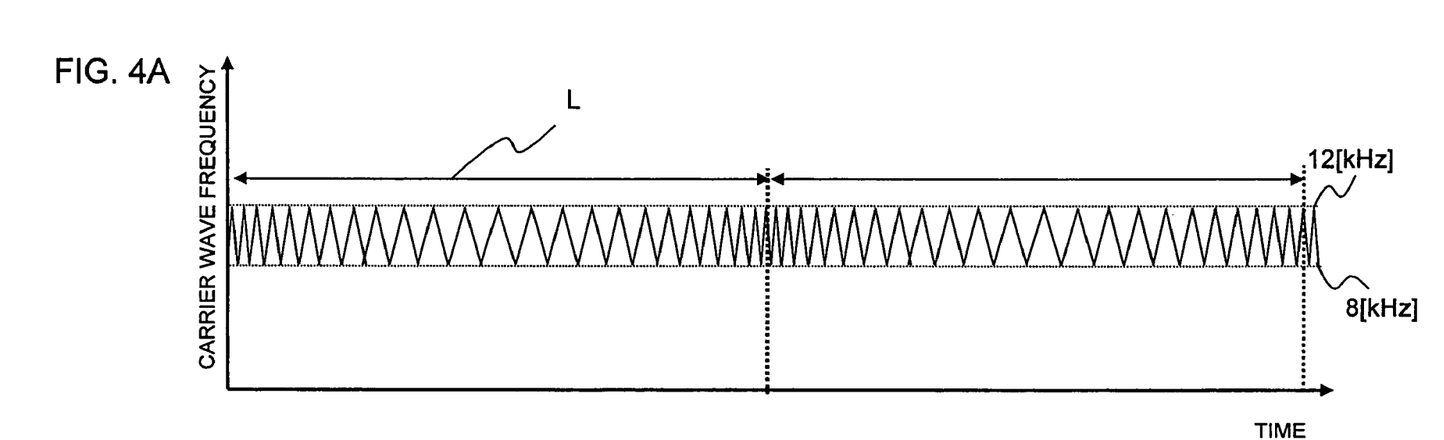
FIGS. 4A and 4B are diagrams showing harmonic noise generated when the carrier wave frequency is changed into a triangular-wave shape by a variable modulation frequency.
Figure 4B:
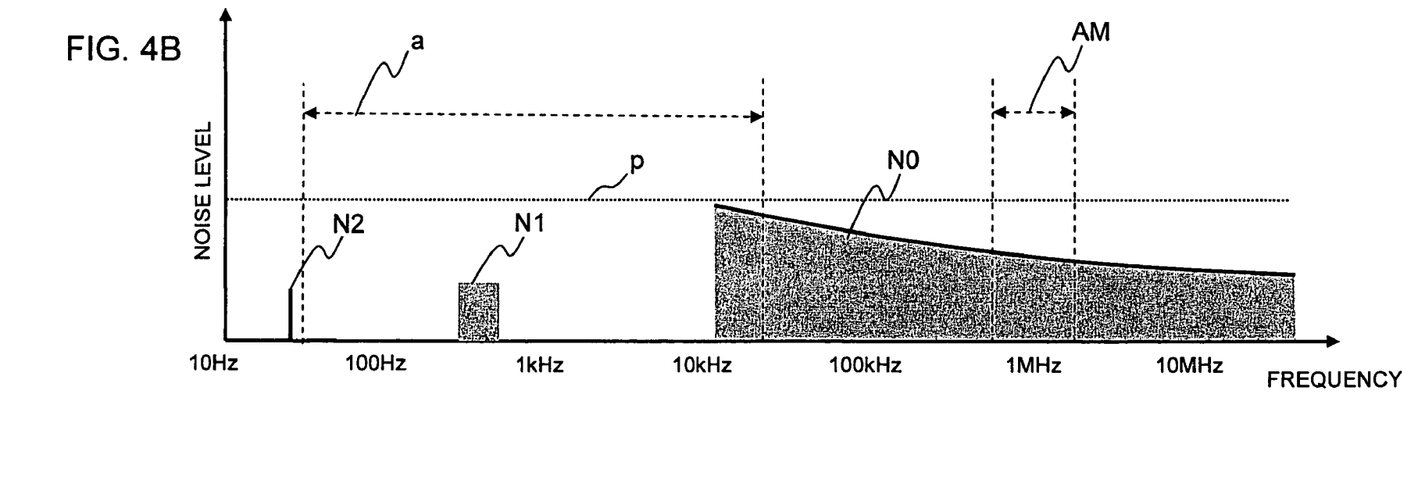

FIG. 4B shows harmonic noise generated when the power control apparatus 1 according to the first embodiment further modulates the modulation frequency of the carrier wave frequency to generate a carrier wave. The carrier wave frequency shown in FIG. 3A is a carrier wave frequency that is changed into a triangular-wave shape by increasing and decreasing the first modulation frequency stepwise with respect to the fundamental frequency. A carrier wave frequency shown in FIG. 4A, on the other hand, is changed into a triangular-wave shape by modulating the first modulation frequency in a range of 500 Hz plus and minus 100 Hz by a step value of 10 Hz (the step value is used as a second modulation frequency with respect to the fundamental frequency).

By changing the carrier wave frequency in this manner, as shown in FIG. 4B, the peak p of the noise caused by the first modulation frequency of the carrier wave frequency can be spread, and the level of acoustic noise perceived by the user can be reduced.

There may be concern about the occurrence of noise caused by the second modulation frequency when listening to the radio. However, of the noise of the second modulation frequency, 10-Hz harmonic noise N2 corresponding to the highest first-harmonic noise is set in a frequency band lower than the audio frequency range "a" audible to the human ear, and therefore undesirable acoustic noise can be sufficiently reduced.

Figure 5:
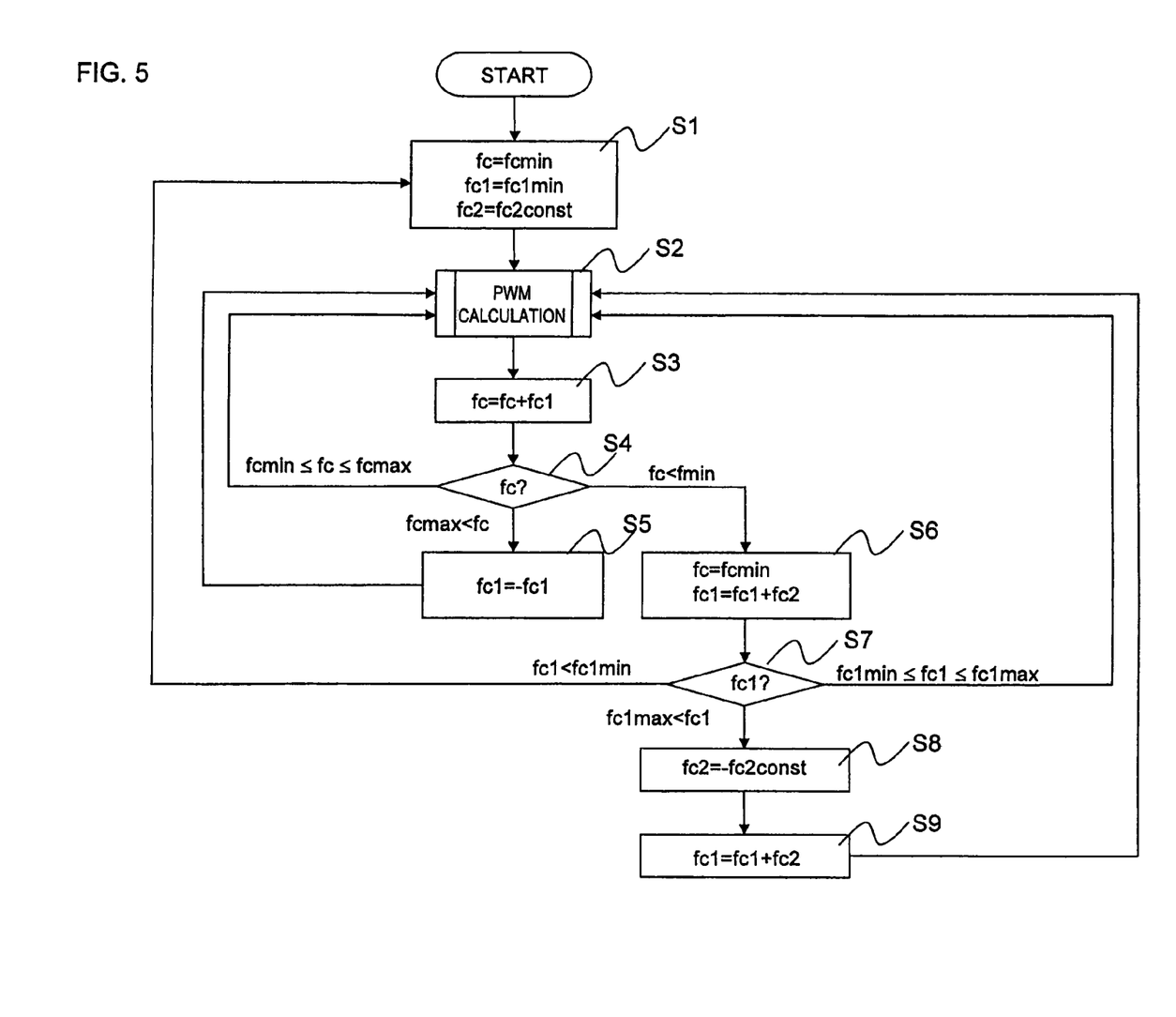
FIG. 5 is a flowchart showing a PWM calculation process for the power conversion apparatus according to certain embodiments of the invention.

Before describing the PWM calculation operation of the PWM inverter 2 in detail, the following definitions are given. A routine for adding a first modulation frequency fc1 to each of values of the carrier wave frequency from the minimum value (hereinafter referred to as "the value fc min") to the maximum value (hereinafter referred to as "the value fc max") and then subtracting the first modulation frequency fc1 from each of the values of the carrier wave frequency from the value fc max to the value fc min is defined as a first routine. In the first routine at each iteration of the calculation process there is no change in the absolute value of the range in which the first modulation frequency fc1 fluctuates with respect to the carrier wave frequency.

A routine for adding the second modulation frequency fc2 to each of values of a first modulation frequency fc1 from the minimum value (hereinafter referred to as "the value fc1 min") to the maximum value (hereinafter referred to as "the value fc1 max") and then subtracting the second modulation frequency fc2 from each of the values of the first modulation frequency fc1 from the value fc1 max to the value fc1 min is defined as a second routine. That is, the carrier wave frequency is changed by steps of the first modulation frequency fc1 each time the PWM calculation process is performed, and the first modulation frequency fc1 is changed by steps of the second modulation frequency fc2 each time the first routine is performed.

The PWM calculation process for inverter control by the power control apparatus 1 according to certain embodiments of the invention is now described with reference to a flowchart shown in FIG. 5.

In the processing of step S1, the PID control units 6a to 6c set the initial values of the carrier wave frequency, the first modulation frequency fc1 and the second modulation frequency fc2 to the values fc min, fc1 min and fc2const (>0), respectively, and advance the process to step S2.

In the processing of step S2, the PWM inverter 2 performs one iteration of the PWM calculation process. In the PWM calculation process, the PWM inverter 2 generates signals for turning on or off the switches Tu+, Tu−, Tv+, Tv−, Tw+ and Tw− of the PWM inverter 2 for PWM control based on the current command values input from the current command generating unit 5 and the current detection values input from the current sensors 4a to 4c. After generating the on/off signals, the PWM inverter 2 advances the process to step S3.

In the processing of step S3, the carrier-wave-frequency changing unit 9 adds the first modulation frequency fc1 (>0) to the carrier wave frequency fc. After increasing the carrier wave frequency fc by the first modulation frequency fc1 (>0), the carrier-wave-frequency changing unit 9 advances the process to step S4.

In the processing of step S4, the carrier-wave-frequency changing unit 9 determines which expression given below the value of the carrier wave frequency fc satisfies.

If the carrier wave frequency fc satisfies expression (1) wherein:

$$fc\ min \leq fc \leq fc\ max, \quad (1)$$

the PID control units 6a to 6c return the process to step S2, and the carrier wave frequency fc is changed through the processing of steps S2 to S3.

In contrast, if the carrier wave frequency fc satisfies expression (2) wherein:

$$fc\ max < fc, \quad (2)$$

the PID control units 6a to 6c advance the process to step S5.

Finally, if the carrier wave frequency fc satisfies expression (3) wherein:

$$fc < f\ min, \quad (3)$$

the PID control units 6a to 6c advance the process to step S6.

In the processing of step S5, the carrier-wave-frequency changing unit 9 changes the operation of the first modulation frequency fc1 added to the carrier wave frequency fc from addition to subtraction (in this case, from positive to negative). When the operation of the first modulation frequency fc1 is changed from addition to subtraction, the carrier-wave-frequency changing unit 9 returns the process to step S2. After performing the PWM calculation, the PWM inverter 2 advances the process to step S3. In the processing of step S3, the carrier-wave-frequency changing unit 9 decreases the carrier wave frequency fc by the first modulation frequency fc1.

In contrast, in the processing of step S6 the carrier-wave-frequency changing unit 9 sets the carrier wave frequency fc to the value fc min, and adds the second modulation frequency fc2 (>0) to the first modulation frequency fc1. Then, the carrier-wave-frequency changing unit 9 advances the process to step S7.

In the processing of step S7, the PID control units 6a to 6c determine which expression given below the first modulation frequency fc1 satisfies.

If the first modulation frequency fc1 satisfies expression (4) wherein:

$$fc1\ min \leq fc1 \leq fc1\ max, \quad (4)$$

the PID control units 6a to 6c return the process to step S2. As described above, the carrier wave frequency increases to the value fc max and thereafter decreases to the value fc min.

Alternatively, if the first modulation frequency fc1 satisfies expression (5) wherein:

$$fc1 < fc1\ min, \quad (5)$$

the PID control units 6a to 6c return the process to step S1.

Finally, if the first modulation frequency fc1 satisfies expression (6) wherein:

$$fc1\ max < fc1, \quad (6)$$

the PID control units 6a to 6c advance the process to step S8.

In the processing of step S8, the carrier-wave-frequency changing unit 9 changes the operation of the second modulation frequency fc2 added to the first modulation frequency fc1 from addition to subtraction (in this case, from positive to negative).

In the processing of step S9, the carrier-wave-frequency changing unit 9 changes (or decreases) the first modulation frequency fc1 by the second modulation frequency fc2. Then, the carrier-wave-frequency changing unit 9 returns the process to step S2.

By performing the above-described process, the carrier wave frequency fc can be changed with time. Further, even the cycle in which the carrier wave frequency fc changes can also be changed with time. Therefore, the level of noise caused by the carrier wave frequency fc and the second modulation frequency fc2 can be reduced.

In the above-described embodiment, the carrier wave frequency fc is modulated into a triangular-wave shape by the first modulation frequency fc1, and the first modulation frequency fc1 is further modulated by the second modulation frequency fc2. However, the invention is not limited to this embodiment. For example, in a case where the peak of the n-th modulation frequency spectrum (n=1, 2, 3, . . . ) is to be reduced, a further modulation may be performed. Further, the waveform is not limited to a triangular waveform, and may be a sinusoidal waveform by example.

Figure 6:
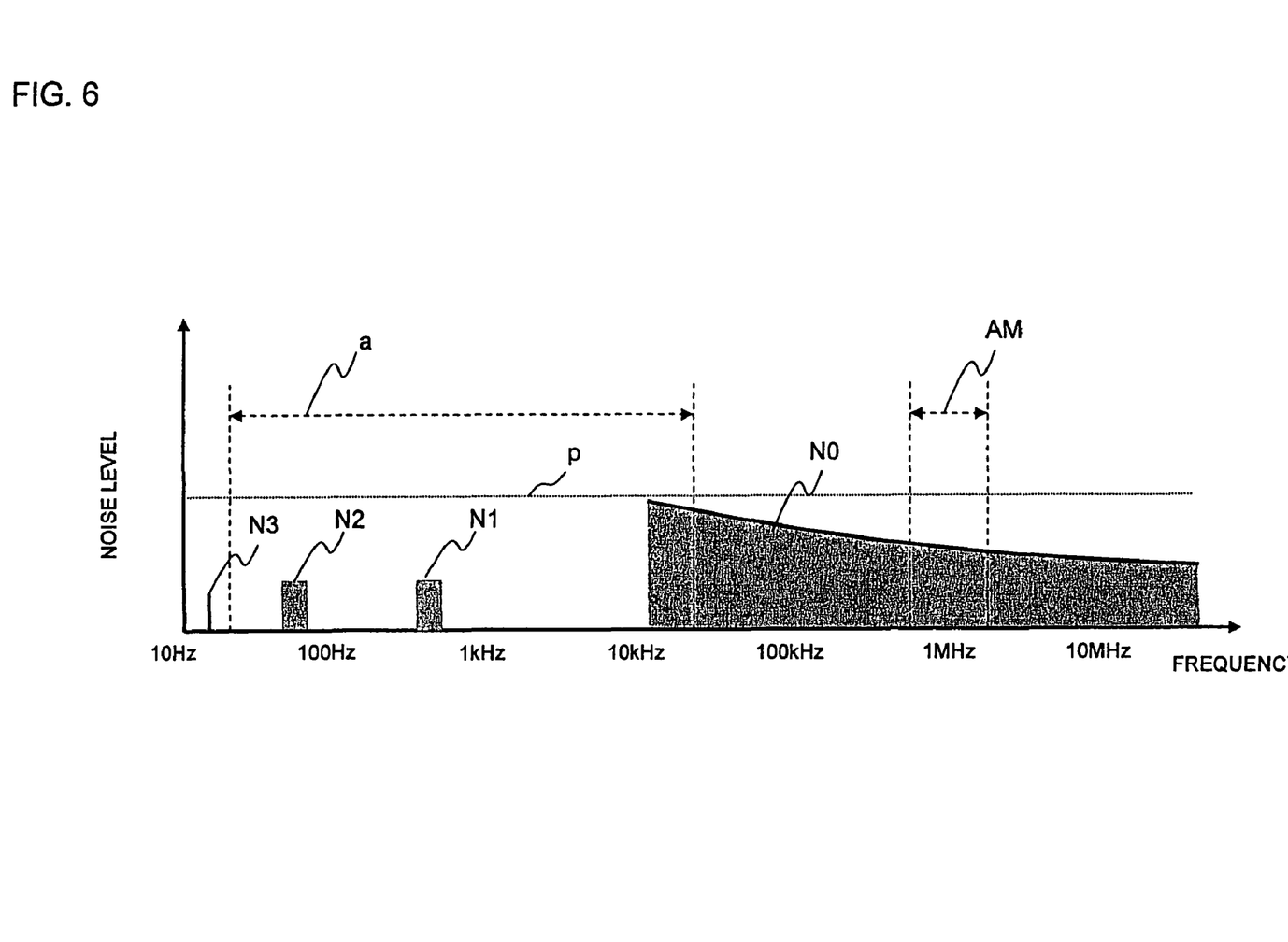
FIG. 6 is a diagram showing harmonic noise generated when the carrier wave frequency is modulated three times.

The modulation process can be performed more than once in order to further reduce acoustic noise. FIG. 6 shows harmonic noise N1, N2, N3 generated when the carrier wave frequency is modulated three times, by way of example.

Furthermore, if the duration of one cycle in which the carrier wave frequency changes (indicated by L in FIG. 4) is constant, it is not necessary to periodically change the cycle in which the carrier wave frequency changes, and the n-th modulation frequency can be arbitrarily changed within one cycle.

The invention can also be applied to H-bridge motor drive apparatuses having a structure similar to the stepping motor control apparatus of Japanese Unexamined Patent Application Publication No. 7-99795, DC-DC converters and other power conversion apparatuses for converting original power from a power source into a different type of power according to the switching conditions.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A power control apparatus for controlling a power conversion device incorporating a switching unit configured to perform switching based on a control signal, comprising:
   a carrier-wave frequency changing unit configured to modulate a frequency of a carrier wave with a desired frequency over predetermined cycles and to modulate the desired frequency within at least one cycle of the predetermined cycles; and
   a comparator configured to compare the carrier wave as modulated by the carrier-wave frequency changing unit to a command value signal for obtaining a desired output voltage and to generate the control signal based on the comparison.

2. The power control apparatus according to claim 1 wherein the carrier-wave frequency changing unit is configured to modulate the desired frequency with a frequency lower than a frequency audible to the human ear with a periodicity within the at least one cycle of the predetermined cycles.

3. The power control apparatus according to claim 1 wherein the carrier-wave frequency changing unit is configured to modulate the desired frequency with a predetermined periodicity within the at least one cycle of the predetermined cycles.

4. The power control apparatus according to claim 3 wherein the carrier-wave frequency changing unit is configured to modulate the desired frequency with the predetermined periodicity into a triangular-wave shape or a sinusoidal-wave shape.

5. The power control apparatus according to claim 4 wherein the carrier-wave frequency changing unit is configured to modulate the desired frequency with a frequency lower than a frequency audible to the human ear with the predetermined periodicity within the at least one cycle of the predetermined cycles.

6. The power control apparatus according to claim 3 wherein the carrier-wave frequency changing unit is configured to modulate the desired frequency with a frequency lower than a frequency audible to the human ear with the predetermined periodicity within the at least one cycle of the predetermined cycles.

7. The power control apparatus according to claim 1, further comprising:
   a command-value signal generating unit configured to generate the command value signal for obtaining the desired output voltage.

8. The power control apparatus according to claim 7, further comprising:
   a carrier wave generating unit configured to output the carrier wave to the carrier-wave frequency changing unit.

9. A power control apparatus for controlling a power conversion device, comprising:
   means for outputting a command value signal for obtaining a desired output voltage;
   means for outputting a carrier wave;
   means for modulating a frequency of the carrier wave with a desired frequency over predetermined cycles;
   means for modulating the desired frequency within at least one cycle of the predetermined cycles;
   means for comparing the carrier wave as modulated with the command value signal and for generating a control signal based on a result of the comparing; and
   means for performing switching based on the control signal.

10. The power control apparatus according to claim 9 wherein the means for modulating the desired frequency comprises means for modulating the desired frequency with a predetermined periodicity within the at least one cycle of the predetermined cycles.

11. The power control apparatus according to claim 10 wherein the means for modulating the desired frequency with the predetermined periodicity comprises modulating the desired frequency with the predetermined periodicity into a triangular-wave shape or a sinusoidal-wave shape.

12. The power control apparatus according to claim 9 wherein the means for modulating the desired frequency comprises means for modulating the desired frequency with a frequency that is inaudible to the human ear with a predetermined periodicity within the at least one cycle of the predetermined cycles.

13. A power control method for controlling a power conversion device including a switching unit, the method comprising:
- generating a command value signal for obtaining a desired output voltage;
- generating a carrier wave;
- modulating a frequency of the carrier wave with a desired frequency over predetermined cycles;
- modulating the desired frequency within at least one cycle of the predetermined cycles;
- comparing the carrier wave as modulated to the command value signal;
- generating a control signal based on a result of the comparing; and
- performing switching based on the control signal.

14. The power control method according to claim 13 wherein modulating the desired frequency comprises:
- modulating the desired frequency with a frequency lower than a frequency audible to the human ear with a periodicity within the at least one cycle of the predetermined cycles.

15. The power control method according to claim 13 wherein modulating the desired frequency comprises:
- modulating the desired frequency with a predetermined periodicity within the at least one cycle of the predetermined cycles.

16. The power control method according to claim 15 wherein modulating the desired frequency comprises:
- modulating the desired frequency with the predetermined periodicity into a triangular-wave shape or a sinusoidal-wave shape.

17. The power control method according to claim 16 wherein modulating the desired frequency comprises:
- modulating the desired frequency with a frequency lower than a frequency audible to the human ear with the predetermined periodicity within the at least one cycle of the predetermined cycles.

18. The power control method according to claim 15 wherein modulating the desired frequency comprises:
- modulating the desired frequency with a frequency lower than a frequency audible to the human ear with the predetermined periodicity within the at least one cycle of the predetermined cycles.

19. The power control method according to claim 13 wherein modulating the desired frequency comprises:
- modulating the desired frequency with a predetermined periodicity within the at least one cycle of the predetermined cycles into a triangular-wave shape.

20. The power control method according to claim 13 wherein modulating the desired frequency comprises:
- modulating the desired frequency with a predetermined periodicity within the at least one cycle of the predetermined cycles into a sinusoidal-wave shape.

* * * * *